United States Patent [19]

Imai

[11] 4,352,544
[45] Oct. 5, 1982

[54] WIDE-ANGLE PHOTOGRAPHIC CAMERA LENS SYSTEM

[75] Inventor: Toshihiro Imai, Hachiouji, Japan

[73] Assignee: Olympus Optical Co., Ltd., Tokyo, Japan

[21] Appl. No.: 173,751

[22] Filed: Jul. 30, 1980

[30] Foreign Application Priority Data

Aug. 1, 1979 [JP] Japan .................. 54/98785

[51] Int. Cl.³ .................. G02B 9/62; G02B 13/04
[52] U.S. Cl. .................. 350/464
[58] Field of Search .................. 350/464

[56] References Cited

U.S. PATENT DOCUMENTS 3,506,339 4/1970 Kazamaki .
3,955,883 5/1976 Sugiyama .
4,068,952 1/1978 Erbert .

FOREIGN PATENT DOCUMENTS 1187393 2/1965 Fed. Rep. of Germany .
2529754 1/1976 Fed. Rep. of Germany ...... 350/464
2825642 12/1978 Fed. Rep. of Germany ...... 350/464
53-6021 11/1978 Japan .
53-129630 11/1978 Japan .

*Primary Examiner*—John K. Corbin
*Assistant Examiner*—Rebecca D. Gass
*Attorney, Agent, or Firm*—Cushman, Darby & Cushman

[57] ABSTRACT

A wide-angle photographic camera lens system which is short in total length, light in weight and corrected favorably in aberrations, and comprises a front diverging lens group and a rear converging lens group: said front lens group consisting of a first positive meniscus lens component and a second negative meniscus lens component, and said rear lens group consisting of a third positive lens component, a fourth negative lens component, a fifth positive meniscus lens component and a sixth positive lens component.

1 Claim, 2 Drawing Figures

WIDE-ANGLE PHOTOGRAPHIC CAMERA LENS SYSTEM

BACKGROUND OF THE INVENTION (a) Field of the invention

The present invention relates to a wide-angle photographic camera lens system having a half field angle of 37.5° and an aperture ratio of 2.8.

(b) Description of the prior art

Though there have conventionally been known retrofocus type of wide-angle photographic camera lens systems consisting of relatively small number of lens components, namely six lens components, there exist only a few lens systems which are compact and especially have short total lengths. As an example of such a few lens systems, there can be mentioned the lens system disclosed by Japanese published unexamined patent application 6021/76. However, this lens system is not sufficiently satisfactory from the viewpoint of the short total length. In view of such circumstance, the applicant has invented a retrofocus type of wide-angle photographic camera lens system which consists of six lens components, has a small telephoto ratio of 2.75, a short total length and is brighter than that of said lens system, and filed Japanese patent application 44920/77 (Japanese published unexamined patent application 129630/78).

SUMMARY OF THE INVENTION

A general object of the present invention is to provide a wide-angle photographic camera lens system having a shorter total length, being lighter in weight and improved in performance to correct aberrations by improving said lens system disclosed by Japanese patent application 44920/77.

DETAILED DESCRIPTION OF THE PREFERRED EMBODIMENT

Figure 1:
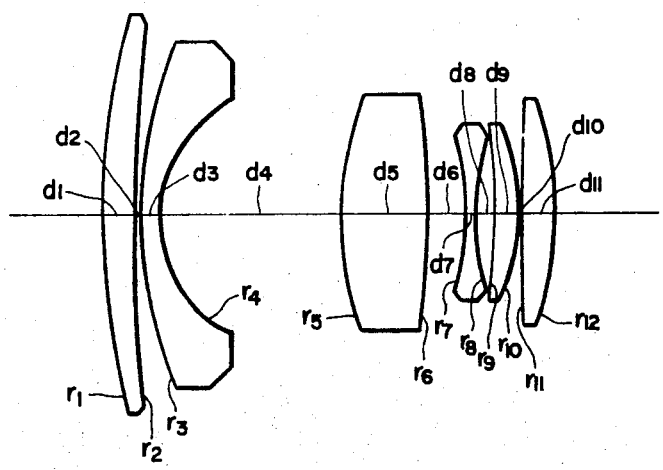
FIG. 1 shows a sectional view illustrating composition of the photographic camera lens system according to the present invention.

The wide-angle photographic camera lens system according to the present invention has such a composition as shown in FIG. 1. Speaking concretely, the lens system comprises a front diverging lens group and a rear converging lens group: said front lens group consisting of a first positive meniscus lens component and a second negative meniscus lens component, and said rear lens group consisting of a third positive lens component, a fourth negative lens component, a fifth positive meniscus lens component and a sixth positive lens component which are arranged consecutively from the object side, and said lens system is characterized in that it has the following numerical data:

$f = 1$
$r_1 = 2.669$
  $d_1 = 0.094$   $n_1 = 1.72000$   $\nu_1 = 43.7$
$r_2 = 9.738$
  $d_2 = 0.003$
$r_3 = 1.281$
  $d_3 = 0.063$   $n_2 = 1.62041$   $\nu_2 = 60.27$

-continued $r_4 = 0.387$
  $d_4 = 0.538$
$r_5 = 0.875$
  $d_5 = 0.300$   $n_3 = 1.80440$   $\nu_3 = 39.62$
$r_6 = -1.243$
  $d_6 = 0.091$
$r_7 = -0.853$
  $d_7 = 0.042$   $n_4 = 1.78472$   $\nu_4 = 25.71$
$r_8 = 0.996$
  $d_8 = 0.052$
$r_9 = -1.558$
  $d_9 = 0.074$   $n_5 = 1.62041$   $\nu_5 = 60.27$
$r_{10} = -0.588$
  $d_{10} = 0.003$
$r_{11} = 10.557$
  $d_{11} = 0.091$   $n_6 = 1.61272$   $\nu_6 = 58.75$
$r_{12} = -0.994$ wherein the reference symbols $r_1$ through $r_{12}$ represent radii of curvature on the surfaces of the respective lens components, the reference symbols $d_1$ through $d_{11}$ designate thicknesses of the respective lens components and airspaces reserved therebetween, the reference symbols $n_1$ through $n_6$ denote refractive indices of the respective lens components, the reference symbol $\nu_1$ through $\nu_6$ represent Abbe's numbers of the respective lens components, the reference symbol f designates focal length of the entire lens system as a whole, the reference symbol $\omega$ denotes half angle of field, and the reference symbol F represents aperture ratio.

In the lens system according to the present invention having the above-mentioned numerical data, the second and third lens components have small thicknesses to reduce weight of the entire lens system as a whole and a wide airspace $d_4$ of 0.538 f is reserved between the second and third lens components. As a result, total focal length $f_F$ of the first and second lens components, i.e., total focal length of the front diverging lens group can be prolonged in absolute value to $f_F = -1.161$ f. Further, this makes it possible to prolong total focal length of the third through the sixth lens components, i.e., total focal length $f_B$ of the rear lens group to $f_B = 0.88$ f. Such long focal lengths of the front diverging lens group and the rear converging lens group mean that each of the lens groups has a weak refractive power. Therefore, owing to the long total focal lengths of the lens group described above, it becomes possible to favorably corrected spherical aberration, coma and astigmatism respectively in the front diverging lens group and in the rear converging lens group respectively.

Figure 2:
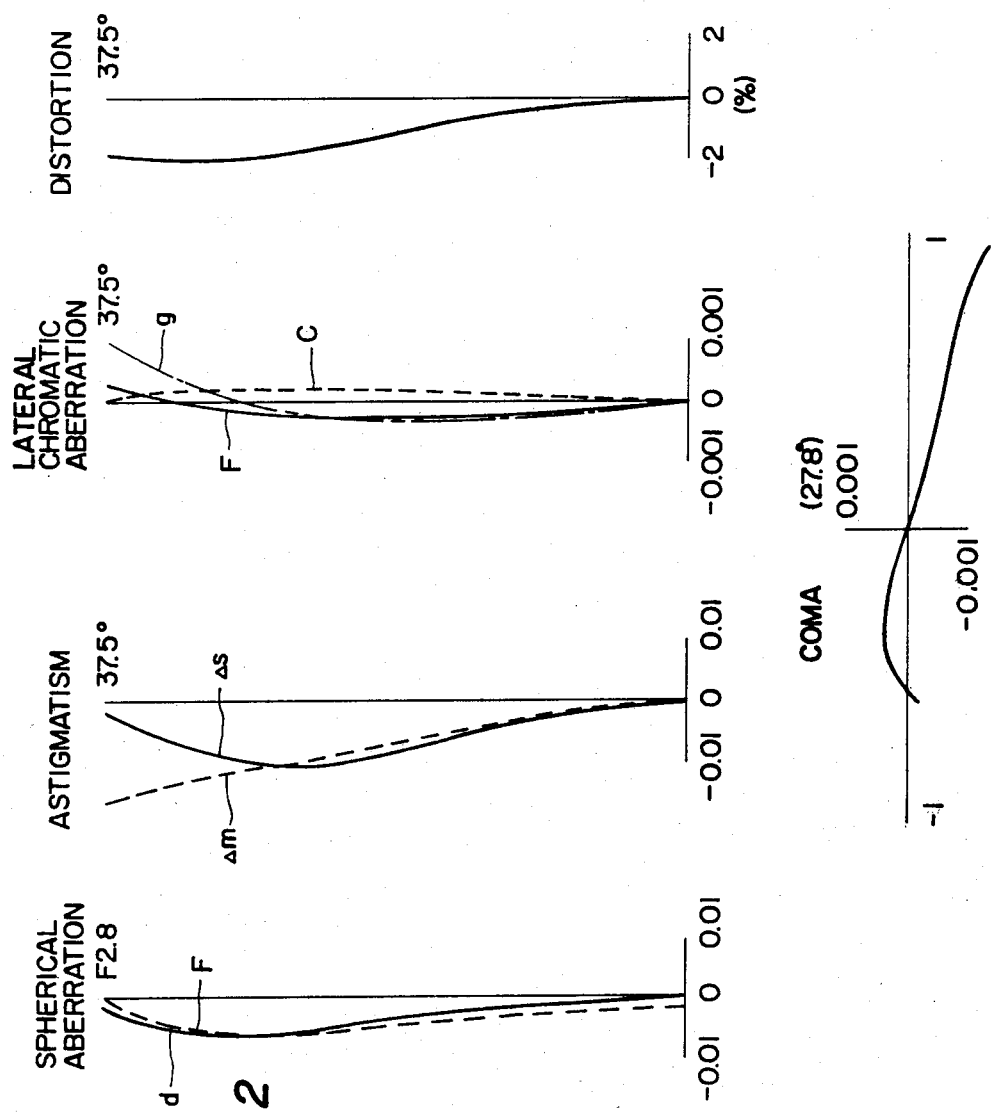
FIG. 2 shows curves illustrating the aberration characteristics of the photographic camera lens system according to the present invention.

This fact is evident from the aberration characteristics of the wide-angle photographic lens system according to the present invention illustrated in the forms of curves in FIG. 2. In the wide-angle photographic camera lens system according to the present invention, various aberrations are corrected respectively and corrected very favorably as a whole. Though optimum image plane varies depending on F-number when aberrations are larger, for example, when spherical aberration curve shows remarkable swelling, such variation is little if aberrations are smaller. In addition, it is possible to prevent remarkable unbalance among aberrations which is caused by variations of F-number and distance to the object to be photographed when aberrations are favorably corrected. Moreover, the lens system according to the present invention has a tele photo ratio of 2.66 which is far smaller than that of the conventional photographic camera lens systems of the same type. As is evident from the foregoing descriptions, the wide-angle lens system according to the present invention is a very excellent photographic camera lens system which is compact, light in weight and has favorable aberrations.

I claim:

1. A wide-angle photographic camera lens system comprising a front diverging lens group consisting of a first positive meniscus lens component and a second negative meniscus lens component, and a rear converging lens group consisting of a third positive lens component, a fourth negative lens component, a fifth positive meniscus lens component and a sixth positive lens component, said photographic camera lens system having the following numerical data:

```
f = 1
r1 = 2.669
    d1 = 0.094      n1 = 1.72000    v1 = 43.7
r2 = 9.738
    d2 = 0.003
r3 = 1.281
    d3 = 0.063      n2 = 1.62041    v2 = 60.27
r4 = 0.387
    d4 = 0.538
```

-continued

```
r5 = 0.875
    d5 = 0.300      n3 = 1.80440    v3 = 39.62
r6 = -1.243
    d6 = 0.091
r7 = -0.853
    d7 = 0.042      n4 = 1.78472    v4 = 25.71
r8 = 0.996
    d8 = 0.052
r9 = -1.558
    d9 = 0.074      n5 = 1.62041    v5 = 60.27
r10 = -0.588
    d10 = 0.003
r11 = 10.557
    d11 = 0.091     n6 = 1.61272    v6 = 58.75
r12 = -0.994
``` wherein the reference symbol f represents focal length of the entire lens system as a whole, the reference symbols $r_1$ through $r_{12}$ designate radii of curvature on the surfaces of the respective lens components, the reference symbols $d_1$ through $d_{11}$ denote thicknesses of the respective lens components and airspaces reserved therebetween, the reference symbols $n_1$ through $n_6$ represent refractive indices of the respective lens components and the reference symbols $v_1$ through $v_6$ designate Abbe's numbers of the respective lens components.

* * * * *